US008054977B2

(12) United States Patent
Kojima

(10) Patent No.: US 8,054,977 B2
(45) Date of Patent: Nov. 8, 2011

(54) MONITORING APPARATUS, METHOD OF CONTROLLING THE MONITORING APPARATUS, AND PROGRAM THEREFOR

(75) Inventor: Nobuyuki Kojima, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1329 days.

(21) Appl. No.: 11/433,686

(22) Filed: May 12, 2006

(65) Prior Publication Data
US 2006/0288206 A1 Dec. 21, 2006

(30) Foreign Application Priority Data
Jun. 15, 2005 (JP) ................. 2005-175507

(51) Int. Cl.
*H04L 9/08* (2006.01)
(52) U.S. Cl. ............... 380/285; 380/259; 713/150
(58) Field of Classification Search .............. 713/1, 150, 713/165, 167, 182, 189; 726/22, 27, 30; 380/1, 2, 200, 243, 277
See application file for complete search history.

(56) References Cited

U.S. PATENT DOCUMENTS

| 6,023,507 A * | 2/2000 | Wookey ............... 709/224 |
| 6,064,915 A | 5/2000 | Kaneko et al. |
| 6,185,681 B1 * | 2/2001 | Zizzi ................. 713/165 |
| 7,222,312 B2 * | 5/2007 | Ferguson et al. .......... 716/3 |
| 2001/0028473 A1 | 10/2001 | Yamasaki et al. |
| 2002/0118838 A1 | 8/2002 | Belenko et al. |
| 2004/0054893 A1 * | 3/2004 | Ellis .................. 713/165 |
| 2004/0179684 A1 | 9/2004 | Appenzeller et al. |
| 2005/0071659 A1 | 3/2005 | Ferguson et al. |
| 2006/0031476 A1 * | 2/2006 | Mathes et al. .......... 709/224 |

FOREIGN PATENT DOCUMENTS

| GB | 2371129 A | 7/2002 |
| JP | 4-318746 A | 11/1992 |
| JP | 2001-256129 A | 9/2001 |
| JP | 2002-353954 A | 12/2002 |

OTHER PUBLICATIONS

HP Web Jetadmin 7.8 Reviewer/Evaluator's Guide 2004, XP002436580 Retrieved from the Internet: URL:http://h10010.www1.hp.com/wwpc/pscmisc/vac/us/product_pdfs/WJA_7.8_Evaluator_Gui de.pdf.

* cited by examiner

Primary Examiner — Minh Dinh
(74) Attorney, Agent, or Firm — Canon U.S.A., Inc., IP Division

(57) ABSTRACT

In a monitoring apparatus adapted to monitor an image forming apparatus, a data acquisition module acquires monitoring information from at least one image forming apparatus. An HTTP server module produces a new encryption key pair including a public key and a private key. The public key is used to encrypt notification information in the user-site centralized monitoring apparatus. The private key is incorporated together with a bunch of private keys produced in the past into a data reading program. Preparations are made so that the data reading program can be downloaded.

14 Claims, 16 Drawing Sheets

| Device ID | 12345678 |
|---|---|
| IP Address | 192.168.0.101 |
| MAC Address | 005C12345678 |
| Device Type | MFP |
| Product Name | OX.5000-6000 |
| Color | 1002323 |
| Mono | 43921 |
| A3 Color | 1234 |
| A4 Color | 32232 |
| A3 Mono | 21 |
| A4 Mono | 21544 |
| B3 Color | 329 |
| B4 Color | 1002 |
| B3 Mono | 23 |
| B4 Mono | 8 |
| TONER CYAN | 73% |
| TONER MAGENTA | 63% |
| TONER YELLOW | 51% |
| TONER BLACK | 36% |
| ⋮ | ⋮ |

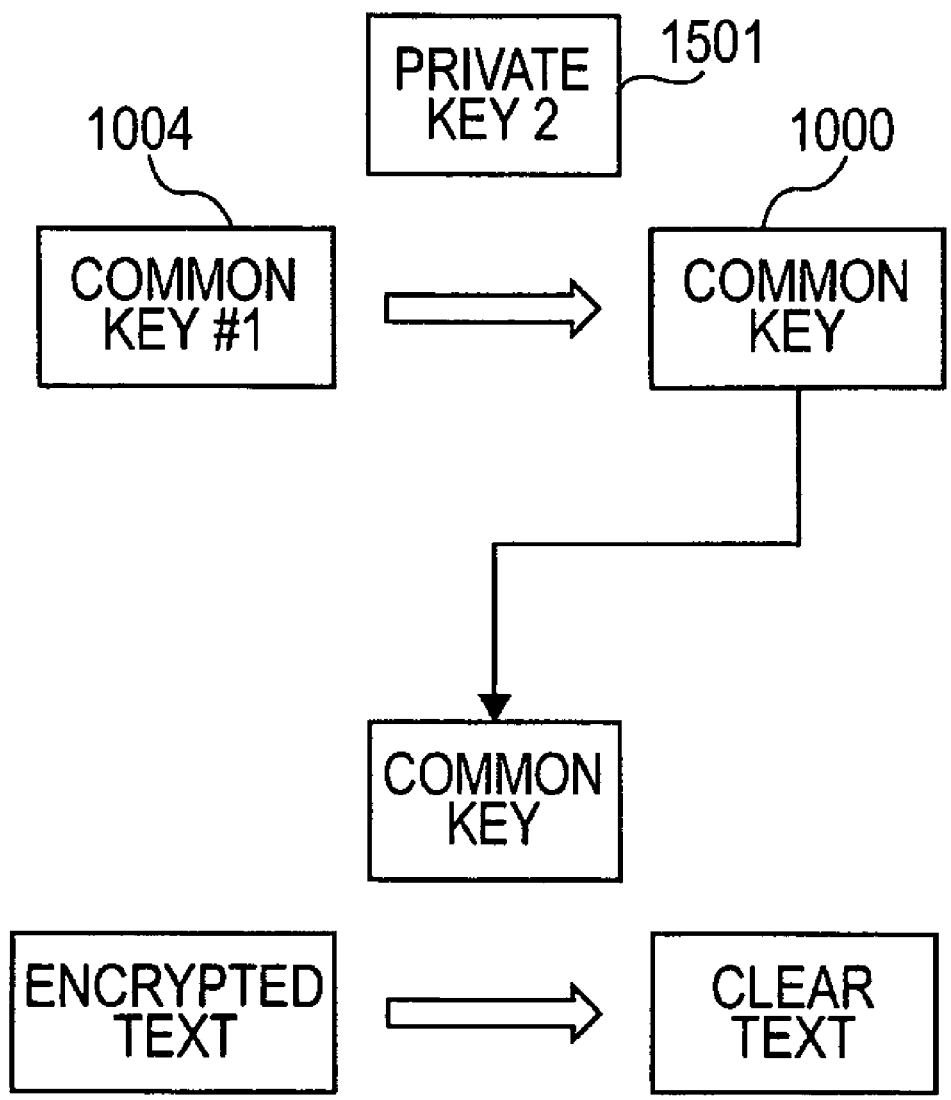

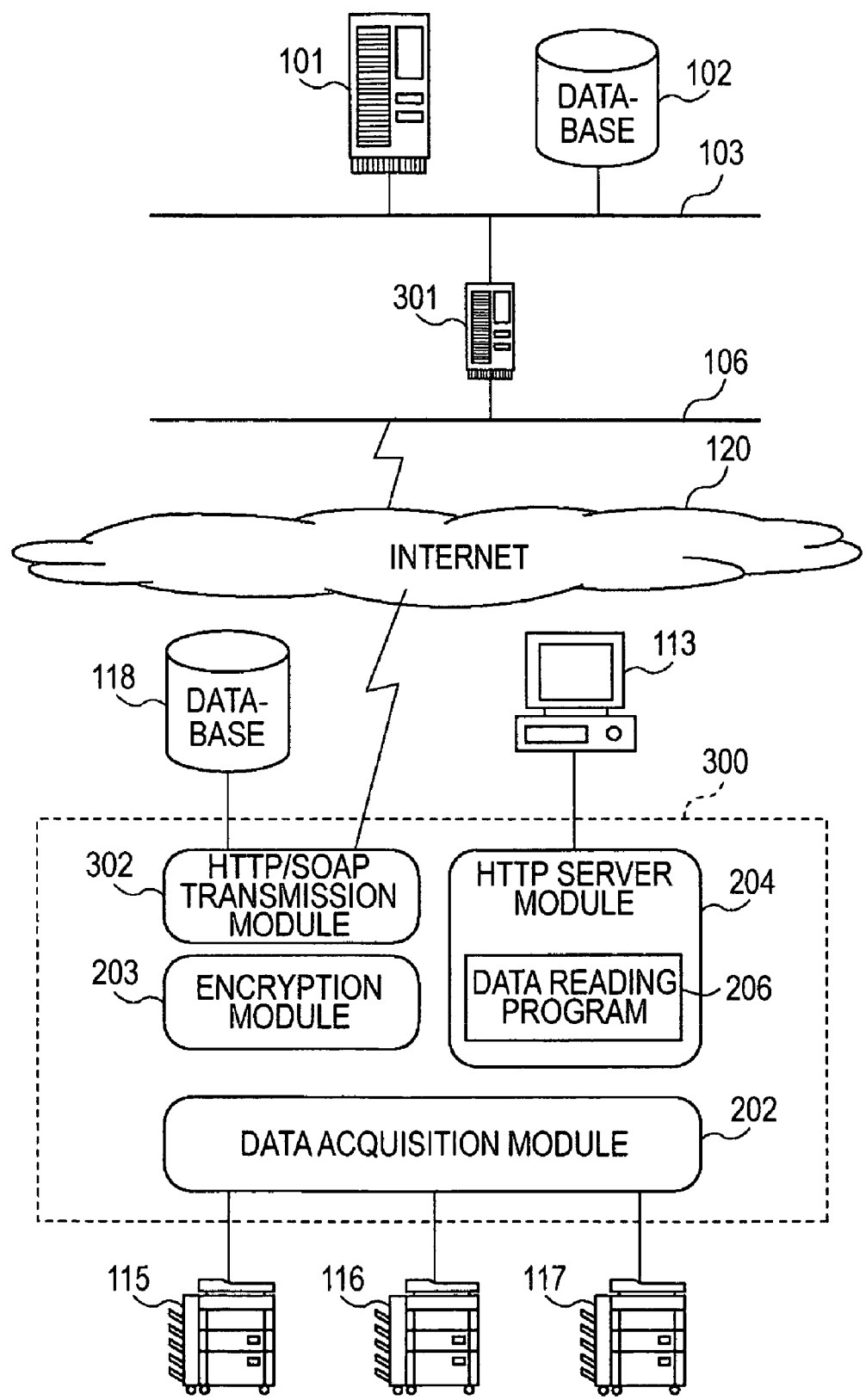

MONITORING APPARATUS, METHOD OF CONTROLLING THE MONITORING APPARATUS, AND PROGRAM THEREFOR

BACKGROUND OF THE INVENTION

1. Field of the Invention

The present invention relates to a monitoring system adapted to acquire operational information associated with an image forming apparatus disposed at a user site.

2. Description of the Related Art

In a conventional monitoring system, such as that disclosed, for example, in Japanese Patent Laid-Open No. 04-318746, a monitoring apparatus installed at each user site acquires information indicating the operational status of an image forming apparatus such as a printer, a copying machine, or a multifunction apparatus installed at the user site and billing information, and transmits the acquired information to a host apparatus installed at a monitoring center such as a service center (or a sales company). In accordance with the received information, the host apparatus at the monitoring center manages all apparatus installed at respective user sites. More specifically, for example, information such as count data indicating the number of printed sheets, or information indicating an occurrence of a failure such as a paper jam, is transmitted to the monitoring apparatus via a communication line, and the monitoring system transfers the information to the service center that manages the image forming apparatus.

However, this conventional monitoring system has a problem with security of information, and thus there is a need for a technique that ensures high security of information in maintaining image forming apparatus.

A public communication line such as the Internet is used for connections between a plurality of monitoring apparatus installed at user sites and the monitoring center host computer system that manages the monitoring apparatus. In the case of transmission of data via such a communication line, data may be encrypted to achieve security of the data. However, when data is encrypted using a public key cryptosystem, only the monitoring center host computer system is allowed to decrypt the data. This causes the problem that when a checker at a user site wants to check the content of data transmitted from a monitoring apparatus at the user site to the monitoring center host computer system, the checker cannot read the data because it is encrypted.

Another problem is that if a decryption key (common key) used to decrypt data transmitted to the monitoring center host computer system is leaked to an unauthorized person, the unauthorized person can decrypt and read the data. This causes a problem with low security.

SUMMARY OF THE INVENTION

In view of the above, the present invention provides a monitoring system adapted to acquire operational information associated with an image forming apparatus having high security in terms of protection of information.

According to an aspect of the present invention, there is provided a monitoring apparatus adapted to acquire monitoring information associated with at least one image forming apparatus and output the acquired monitoring information to an external apparatus, the monitoring apparatus comprising an acquisition unit adapted to acquire the monitoring information associated with the image forming apparatus, and an output unit adapted to set output destinations of notification information including the monitoring information to a first output destination assigned to the external apparatus and also to a second output destination different from the first output destination, and to output the notification information to said output destinations, wherein the monitoring information included in the notification information output to the second output destination is readable by a further external information processing apparatus.

According to an aspect of the present invention, there is provided a control method of acquiring monitoring information associated with at least one image forming apparatus and transmitting the acquired monitoring information to an external apparatus, the method comprising the steps of acquiring the monitoring information associated with the image forming apparatus, and outputting notification information including the monitoring information, the outputting step including setting output destinations of the notification information to the first output destination assigned to the external apparatus and to the second output destination different from the first output destination and outputting the notification information to the set output destinations, wherein the monitoring information included in the notification information output to the second output destination is readable by an external information processing apparatus.

According to an aspect of the present invention, there is provided a computer-readable program which when loaded into and executed by a computer provides a control method.

Further features of the present invention will become apparent from the following description of exemplary embodiments with reference to the attached drawings.

BRIEF DESCRIPTION OF THE DRAWINGS

FIG. 7 is a diagram showing an example of monitoring information acquired by a data acquisition module.

FIG. 15 is a diagram showing a decryption process.

FIG. 16 is a diagram showing a general configuration of a monitoring system according to an embodiment of the present invention.

DESCRIPTION OF THE EMBODIMENTS

A preferred embodiment of the present invention will now be described in detail with reference to the drawings. It should be noted that the relative arrangement of the components, the numerical expressions and numerical values set forth in these embodiments do not limit the scope of the present invention unless it is specifically stated otherwise.

The present invention is described in further detail below with reference to embodiments in conjunction with the accompanying drawings.

First Embodiment

Figure 1:
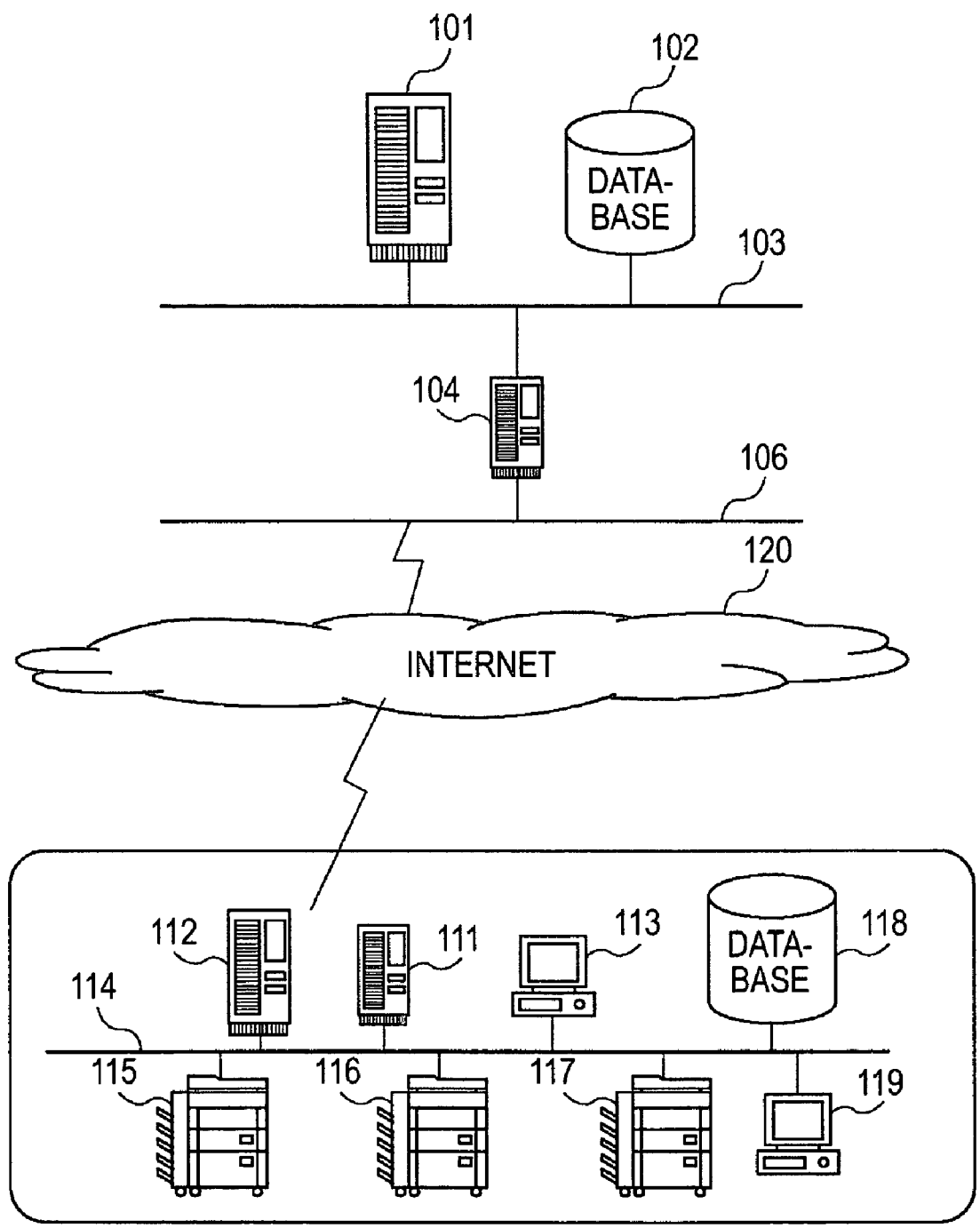
FIG. 1 is a diagram showing a general configuration of a monitoring system according to an embodiment of the present invention.

FIG. 1 is a diagram showing a general configuration of a monitoring system according to a first embodiment of the present invention.

As shown in FIG. 1, the monitoring system includes, at a service center responsible for monitoring image forming apparatus, a monitoring center host computer system (hereinafter referred to as the MCHC system) 101, a database 102 in which sales information and information associated with the system are stored, an SMTP (Simple Mail Transfer Protocol) server 104 adapted to transmit and receive e-mails, and a LAN (Local Area Network) 103 that connects these units to each other. Note that in the example shown in FIG. 1, although the MCHC system 101 includes only one computer, there is no particular restriction on the number of computers included in the MCHC system 101. For example, to achieve high processing power, the MCHC system 101 may include a plurality of workstations connected to each other.

The SMTP server 104 is connected to the Internet 120 via a LAN 106. If the SMTP server 104 receives an e-mail via the Internet 120, the SMTP server 104 transfers the received e-mail to the MCHC system 101.

The monitoring system also includes, at each user site where an image forming apparatus to be monitored is installed, a user-site centralized monitoring apparatus 111, a database 118, an SMTP server 112, client computers (PCs) 113 and 119, image forming apparatus 115, 116, and 117, and a LAN 114 that connects the above units to each other.

As for the image forming apparatus 115, 116, and 117, a multifunction apparatus having a copying function, a printing function, a facsimile function, and/or the like, or a printer (such as an electrographic printer or an ink-jet printer) adapted to receive data from the PC 113 or the like and print the received data may be used. Other devices such as a scanner or a facsimile device may also be used as the image forming apparatus 115, 116, and 117.

The user-site centralized monitoring apparatus 111 acquires monitoring information from the image forming apparatus 115, 116, and 117 via the LAN 114 at predetermined intervals. The monitoring information may include, for example, counter information, status information including information indicating an error such as a paper jam, and information associated with consumables such as paper, toner, etc. A specific example of monitoring information is shown in FIG. 7. The user-site centralized monitoring apparatus 111 attaches the monitoring information acquired from the image forming apparatus 115, 116, and 117 to an e-mail and broadcasts the e-mail together with the attached monitoring information to the first MCHC system 101 specified as a first output destination and the PC 119 specified, by a manager at the user site, as a second output destination different from the first output destination, using the SMTP server 112 connected to the Internet 120. If the PC 119 receives the e-mail from user-site centralized monitoring apparatus 111, the PC 119 stores necessary information including a file of the monitoring information extracted from the e-mail in the database 118 or a file server (not shown) at the user site.

A checker responsible for checking monitoring information downloads a data reading program for reading the monitoring information from the user-site centralized monitoring apparatus 111 into the PC 113.

Note that although in the example shown in FIG. 1, the database 102 is disposed in a separate fashion and connected to the LAN 103, the database 102 may be physically disposed inside the MCHC system 101. Also note that although only one MCHC system 101 and one database 102 are shown in FIG. 1, there is no particular restriction on the numbers of MCHC systems and databases. That is, a plurality of MCHC systems and databases may be connected to the LAN 103 so that a processing load associated with acquisition of information from a plurality of image forming apparatuses or user-site centralized monitoring apparatuses is distributed among the plurality of MCHC systems.

Although in the above-described example, the user-site centralized monitoring apparatus 111 transmits the monitoring information to the PC 119 by attaching the monitoring information to an e-mail, the user-site centralized monitoring apparatus 111 may directly transmit the monitoring information in the form of a file to the database 118 or the file server. Although in the present example, it is assumed that the PC 119 is specified as the destination of the e-mail, the PC 113 may be specified as the destination of the e-mail, and the data-reading program may be downloaded not only to the PC 113, but also to the PC 119.

Figure 2:
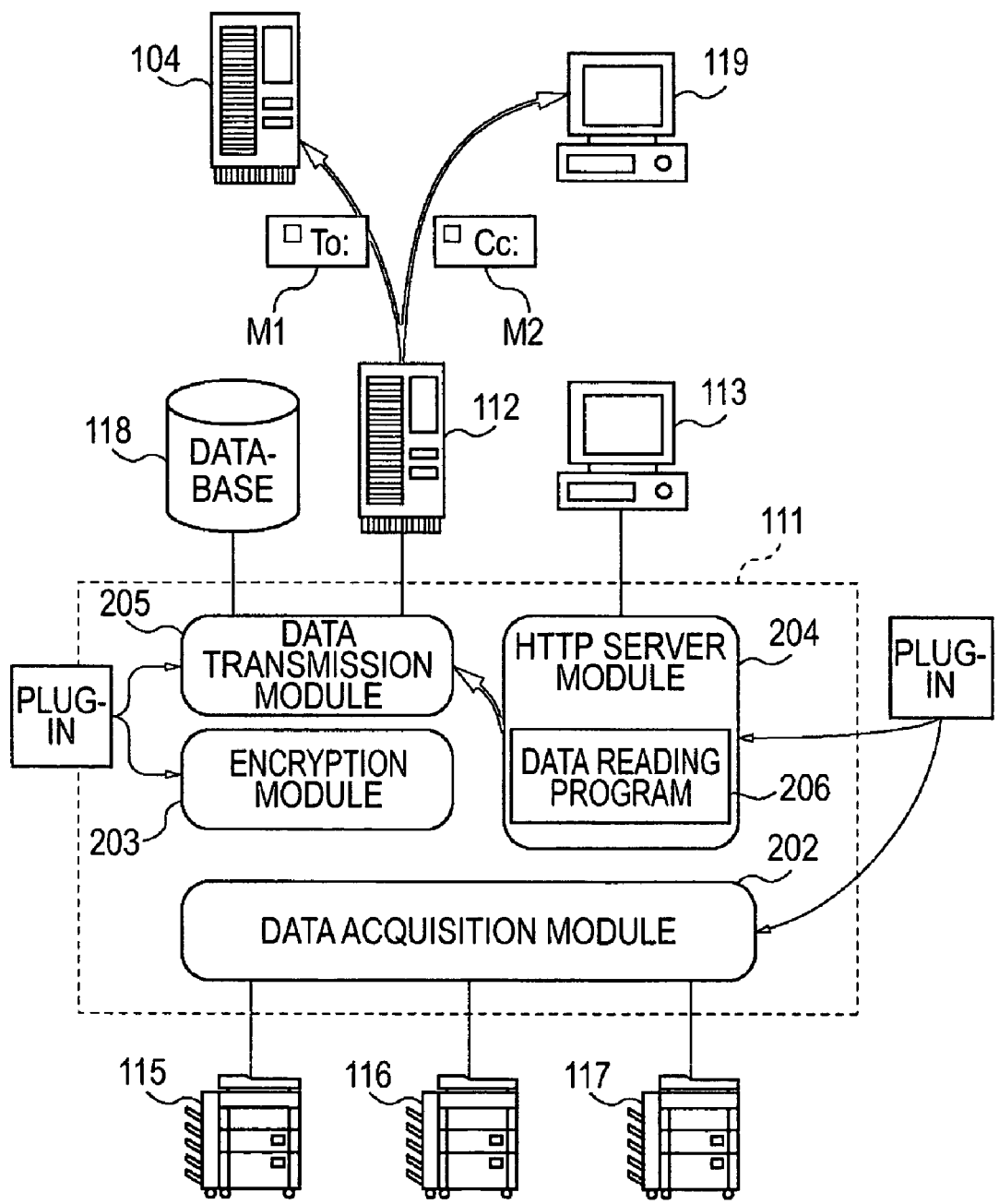
FIG. 2 is a diagram showing a general module structure of a user-site centralized monitoring apparatus shown in FIG. 1.

FIG. 2 is a diagram showing a general module structure of the user-site centralized monitoring apparatus 111 shown in FIG. 1.

As shown in FIG. 2, the user-site centralized monitoring apparatus 111 has software modules including a data acquisition module 202 that acquires monitoring information from the image forming apparatus 115, 116, and 117, and an encryption module 203 that produces an encryption key used to encrypt the acquired monitoring information. More specifically, the encryption module 203 produces an encryption key pair including a public key (encryption information) and a private key (decryption information) thereby allowing a common key used to encrypt the acquired monitoring information to be encrypted by a public key cryptosystem.

The user-site centralized monitoring apparatus 111 includes an HTTP (Hyper Text Transfer Protocol) server module 204 that provides a user interface for the checker or a manager at the user site to make settings associated with the user-site centralized monitoring apparatus 111, and also includes a data transmission module 205 adapted to transmit the encrypted monitoring information by attaching it to an e-mail.

Of a plurality of output destinations (such as the MCHC system 101 and the PC 119) of the e-mail transmitted by the data transmission module 205, the output destination at the user site (such as the PC 119) is allowed to be changed in accordance with a command input from the outside. For example, a user interface for changing the output destination is output to an external apparatus from the HTTP server module 204, and a new output destination is specified via the user interface.

The software modules described above may be added as plug-in modules to the OS (Operating System) or may be removed from the OS so as to achieve desirable functions.

Any parts of the user-site centralized monitoring system may be provided as a place where the plug-in modules can be added or removed. For example, the data transmission module 205 having the function of performing communication using the SMTP (Simple Mail Transfer Protocol) may be replaced with another module such as an HTTP/SOAP transmission module having a function of performing communication using HTTP or SOAP (Simple Object Access Protocol).

The data acquisition module 202 acquires, at scheduled time intervals, the monitoring information described above with reference to FIG. 1 from the image forming apparatus 115, 116, and 117 on the LAN 114 by using the SNMP (Simple Network Management Protocol) or another protocol, and the data acquisition module 202 converts the acquired monitoring information into data in a predetermined format and stores it.

The encryption module 203 has, in addition to the capability of producing the encryption key pair, the capability of performing an encryption process shown in FIG. 10 using the encryption key pair. The encryption module 203 notifies the data transmission module 205 of the public key of the produced encryption key pair. The encryption module 203 stores history information indicating private keys produced in the past and key IDs (private key identification information) identifying the private keys. The encryption module 203 also has the capability of incorporating the private key into the data-reading program 206.

The data-reading program 206 is application software to decrypt the encrypted monitoring information and display the resultant monitoring information. The data-reading program 206 is stored and managed by the HTTP server module 204. After the private key is incorporated in the form of the bunch of keys into the data-reading program 206, the resultant data-reading program 206 is supplied to the PC 113 used by the checker. The supplying of the data-reading program 206 may be accomplished, for example, by means of downloading.

The HTTP server module 204 has the capability of downloading the data-reading program 206 from the user-site centralized monitoring apparatus 111 into the PC 113 used by the checker. The data transmission module 205 has, in addition to the capability of producing and transmitting an e-mail, the capability of storing a data file on a hard disk (not shown) in the user-site centralized monitoring apparatus 111 or in an external database 118 or file server. In the transmission of notification information, such as that shown in FIG. 11, output from the user-site centralized monitoring apparatus 111, the data transmission module 205 may transmit it in the form of an e-mail or a file or data.

If the SMTP server 112 receives an e-mail from the data transmission module 205, the SMTP server 112 transfers the e-mail M1 to a destination specified in a "TO" field of the e-mail and transmits an e-mail M2 having the same content as that of the e-mail M1 to a destination specified in a "CC" field. The output destination specified in the "TO" field and the output destination specified in the "CC" field are set in accordance with destination setting information stored in a nonvolatile memory such as a ROM (not shown) by the data transmission module 205 of the user-site centralized monitoring apparatus 111.

The first destination at the service center and the second destination at the user site do not necessarily need to be expressed in the form of e-mail addresses, but they may be expressed in other forms such as a file path or URL. Furthermore, the first destination may be expressed in a different form from that of the second destination. For example, the first destination may be expressed in the form of an e-mail address, while the second destination may be expressed in the form of a file path. Note that in the following description it is assumed that a plurality of destinations, including at least the first and second destinations, are expressed in the form of e-mail addresses, by way of example.

A process performed in the monitoring system shown in FIG. 1 is described below with reference to FIGS. 3 to 13.

Figure 3:
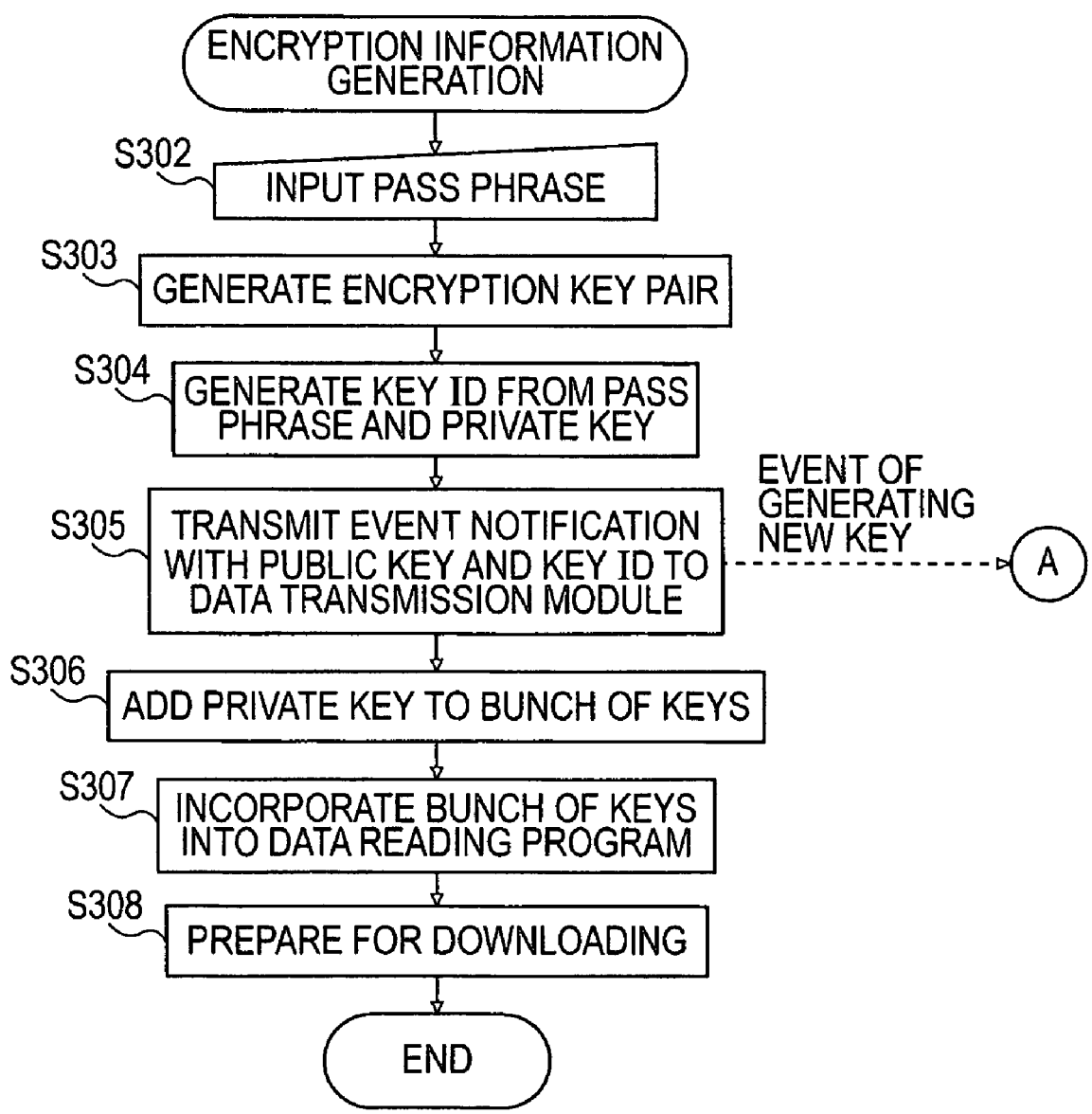
FIG. 3 is a flowchart showing a process performed by an HTTP server module shown in FIG. 2.

FIG. 3 is a flowchart showing a process performed by the HTTP server module 204 shown in FIG. 2. In this process, performed mainly by the HTTP server module 204, an encryption key and information identifying the encryption key are produced.

The HTTP server module 204 produces a new encryption key pair including a public key and a private key based on a password input by a checker, and transfers the public key to the data transmission module 205. The HTTP server module 204 adds the newly produced private key to the bunch of private keys produced in the past and incorporates the resultant bunch of private keys into the data-reading program 206 such that the checker can download private keys as required.

The process shown in FIG. 3 is started after the initial setting associated with the user-site centralized monitoring apparatus 111 is performed. This process is performed by various modules shown in FIG. 2. More specifically, immediately after the user-site centralized monitoring apparatus 111 is activated, that is, immediately after the HTTP server module 204 is activated, the checker accesses the HTTP server module 204 in the user-site centralized monitoring apparatus 111 via a web browser running on the PC 113, and inputs an arbitrary pass-phrase as a password (step S302).

Figures 4, 5:
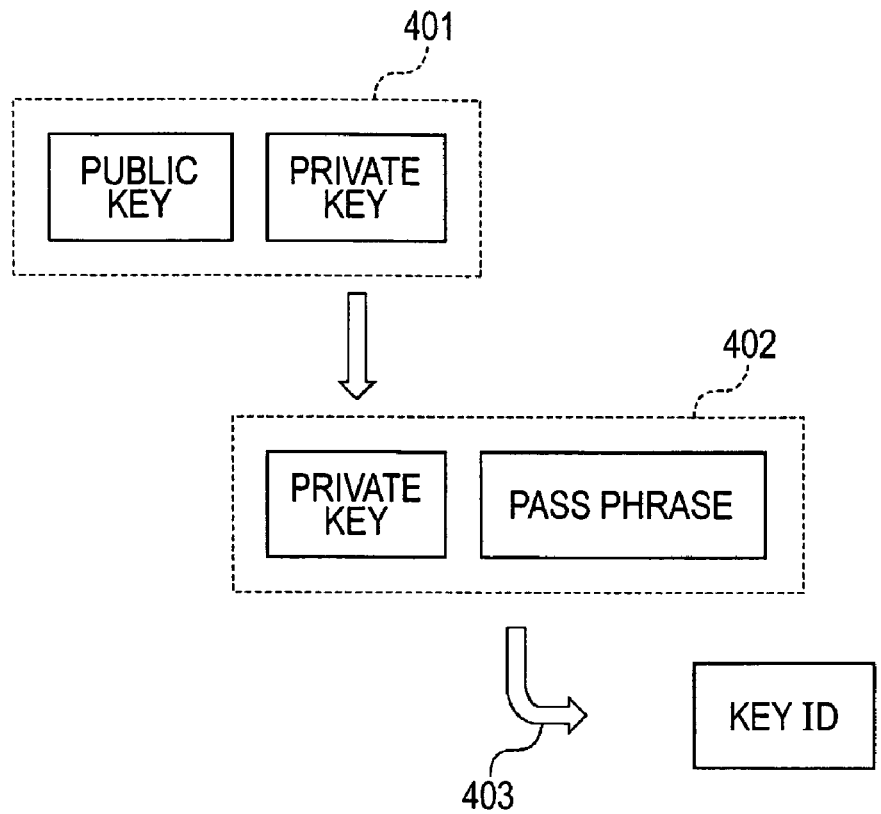
FIG. 4 is a diagram showing a process of producing a key ID from a private key and a pass-phrase.
FIG. 5 is a diagram showing an example of a bunch of keys.

Thereafter, the encryption module 203 produces a new encryption key pair including a public key and a private key (step 303). Subsequently, the encryption module 203 produces a key ID based on the private key of the produced encryption key pair and the pass-phrase input in step S302 (step S304). In this step, as shown in FIG. 4, the private key is extracted from the encryption key pair 401, and a character string 402 is produced from the private key and the pass-phrase. A hash value calculation 403 is performed on the produced character string 402, and the resultant hash value is employed as the key ID. Note that the key ID is not limited to the hash value, but the key ID may be determined in a different way as long as the key ID definitely identifies decryption information used to decrypt the encrypted information. For example, a checksum value may be used as the key ID. Note that the encrypted information herein refers to the information encrypted using the public key in step S303.

Referring again to FIG. 3, in step S305, information associated with the produced encryption key (the public key of the encryption key pair 401 and the key ID) is transmitted as "new key production event" information from the HTTP server module 204 to the data transmission module 205. In the next step S306, the private key of the encryption key pair 401 is added to the bunch of private keys produced in the past. As shown in the table 501 shown in FIG. 5, the bunch of keys includes one or more private keys produced in the past. Note that pass-phrases and hash values are not included in the bunch of keys.

In the next step S307, the bunch of private keys is incorporated into the data-reading program 206.

In the next step S308, a preparation is made so that the data-reading program 206 can be downloaded by the checker. More specifically, setting associated with the link of a web page provided by the HTTP server module 204 and rewriting of an HTTP file are performed so that the data-reading program can be downloaded from a web page. As a result of the process in step S308, information associated with the newly produced encryption key is provided to an external apparatus such as the PC 113 and the information associated with the encryption key is stored as history information indicating encryption keys of respective generations.

The bunch of encryption keys may be provided to an external apparatus such as the PC 119 or the database 118 not only by means of downloading using the data-reading program, but by other means. For example, the bunch of private keys may be described in a file and the file may be supplied to the external apparatus.

Thus, by using an encryption key produced for each user or user site in the manner described above, it becomes possible to prevent a third person from decrypting data, and thus it becomes possible to prevent information from being leaked.

Figure 6:
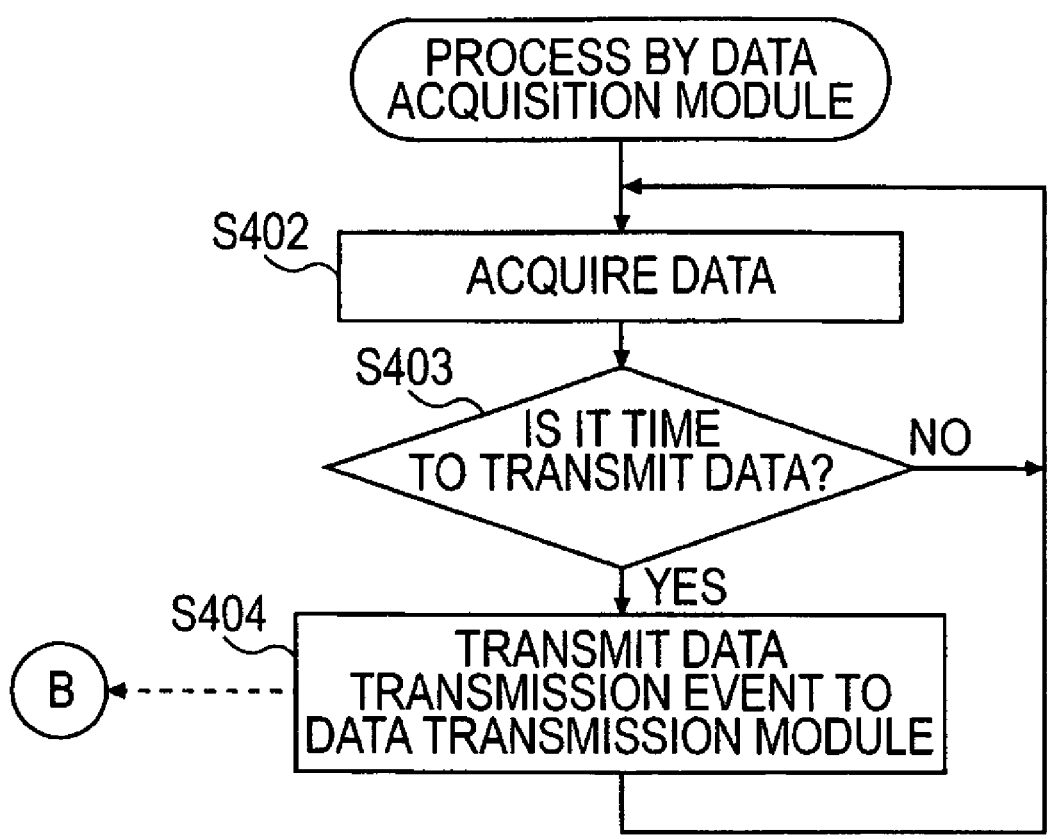
FIG. 6 is a flowchart showing a process performed by a data acquisition module shown in FIG. 2.

FIG. 6 is a flowchart showing a process performed by the data acquisition module 202 shown in FIG. 2.

The data acquisition module 202 periodically acquires monitoring information from the image forming apparatus 115 and the like, and transmits the acquired information to the MCHC system 101 at scheduled time intervals.

In FIG. 6, when the user-site centralized monitoring apparatus 111 is activated, the data acquisition module 202 first accesses the image forming apparatus 115 to 117 to acquire monitoring information therefrom (step S402). In the present embodiment, the monitoring information acquired from the image forming apparatus 115 to 117 via the communication line may be directly stored or may be converted into a predetermined format and the resultant information may be stored.

As shown in the form of a table 701 in FIG. 7, the monitoring information includes information indicating the operation status of the image forming apparatus 115 to 117, such as counter information, status information, and/or consumable information. In the example of the monitoring information described in the table 701, numbers of printed sheets (A3 Color: 1234, A4 Mono: 21544, etc.) are used as billing information indicating billing for printing, and remaining amounts of consumables (TONER CYAN: 73%, etc.) are used to determine whether to replenish consumables or to manage the lifetime of parts used in the image forming apparatus.

In step S403, a determination is made as to whether it is one of the scheduled times at which monitoring information is transmitted to the MCHC system 101. If it is not a scheduled time, the process returns to step S402 without transmitting monitoring information, and monitoring of the image forming apparatus 115 to 117 is continued. If it is a scheduled time, a data-transmission request is transmitted from the data acquisition module 202 to the data transmission module 205 to transmit monitoring information data to the MCHC system 101 (step S404). Thereafter, the process returns to step S402 to further monitor the image forming apparatus 115 to 117.

Figure 8:
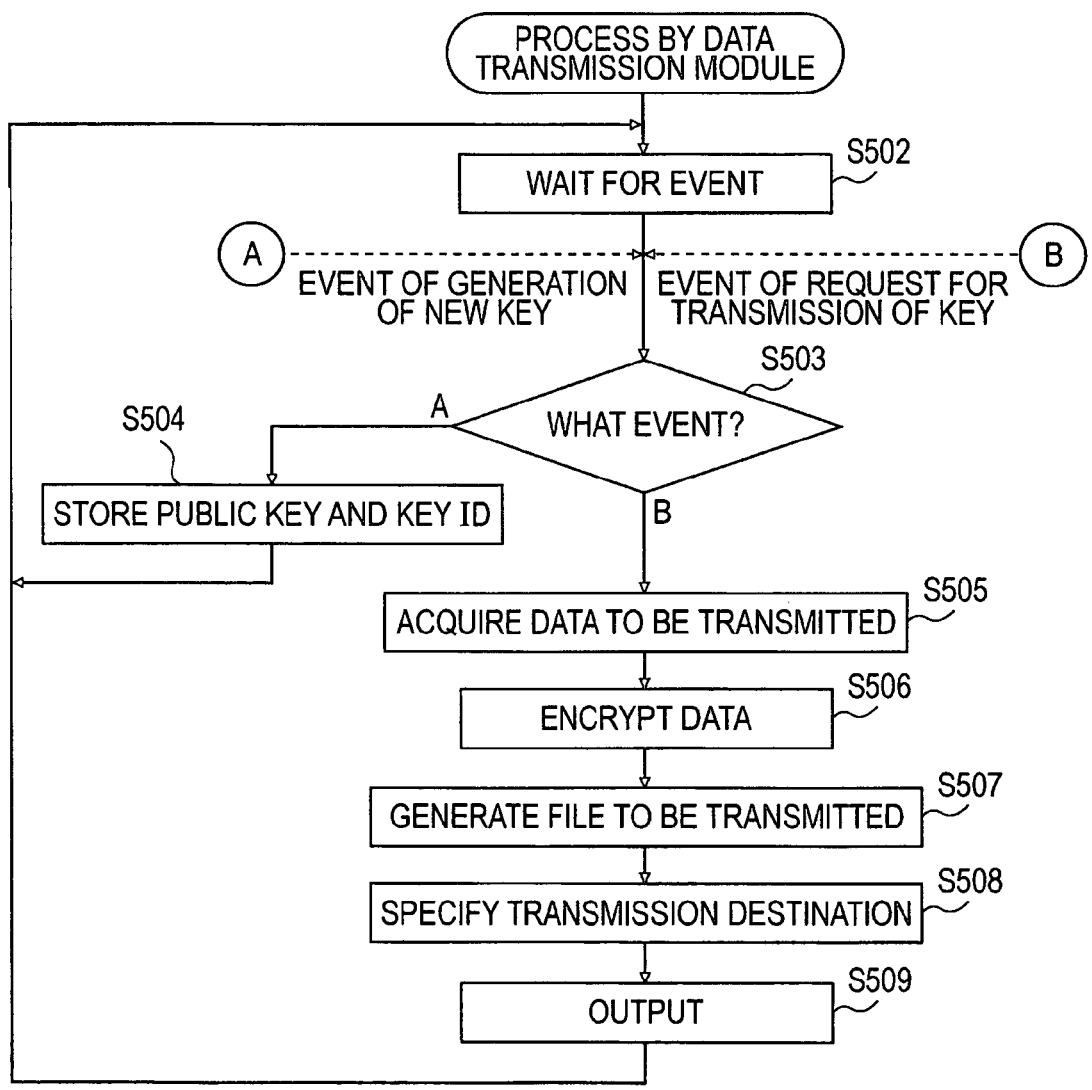
FIG. 8 is a flowchart showing a process performed by a data transmission module shown in FIG. 2.

FIG. 8 is a flowchart showing a process performed by the data transmission module 205 shown in FIG. 2.

The data transmission module 205 receives a public key and a key ID from the HTTP server module 204, encrypts the monitoring information received from the data acquisition module 202 by using the public key, and transmits the resultant encrypted monitoring information.

In FIG. 8, when the data transmission module 205 is activated, the data transmission module 205 waits for a notification of an event (step S502). Herein, possible events include a "new key production" event, that is, an event of production of a public key and a key ID notified from the HTTP server module 204, and a "data transmission request" event notified from the data acquisition module 202.

Figure 9:
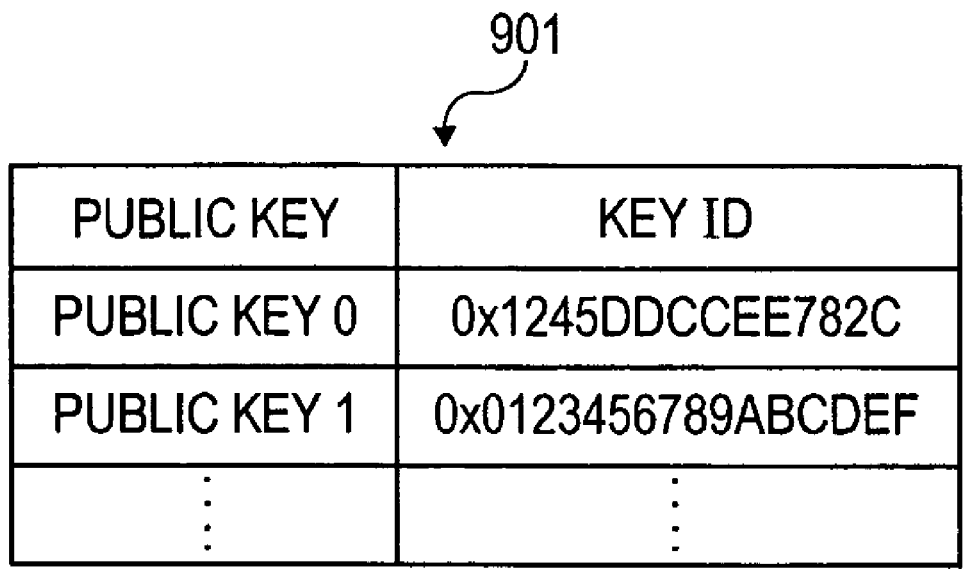
FIG. 9 is a diagram showing an example of a table in which public keys and key IDs are described.

In step S503, a determination is made as to the type of the notified event. In a case in which it is determined that the "new key production" event (A) has occurred, the process proceeds to step S504. In step S504, the public key and the key ID received from the HTTP server module 204 are stored as encryption information and identification information identifying decryption information used to decrypt encrypted information. The public key stored herein is used later in step S506 to encrypt information. The key ID is used later in step S507 to produce a file to be transmitted. As shown in FIG. 9, public keys and key IDs are stored in a table 901 over a plurality of generations.

In the example shown in FIG. 9, a public key 0 is a public key for use by the MCHC system 101. Note that this public key 0 is used without being changed. In contrast, a public key 1 is produced as an updated key. Unlike the bunch of keys described above with reference to FIG. 5, public keys and key IDs produced in the past are not stored, but a current public key and key ID are replaced with a new public key and key ID when they are newly produced.

By updating the encryption key pair used at each user site at proper times, it becomes possible to protect information even when the encryption key used at the user site is leaked. This ensures high security.

Referring again to FIG. 8, if it is determined in step S503 that the notified event is a "data transmission request" event, the process proceeds to step S505. In step S505, monitoring information data is acquired from the data acquisition module 202. In the next step S506, the acquired monitoring information data is encrypted using the public key (encryption information) as shown in FIGS. 10A to 10C.

The encryption process is described in detail below with reference to FIGS. 10A to 10C.

Figure 10A:
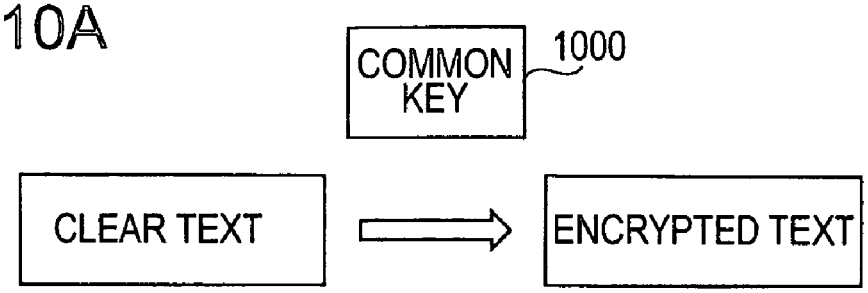
FIG. 10A shows a process of encrypting a plaintext using a common key.
Figure 10B:
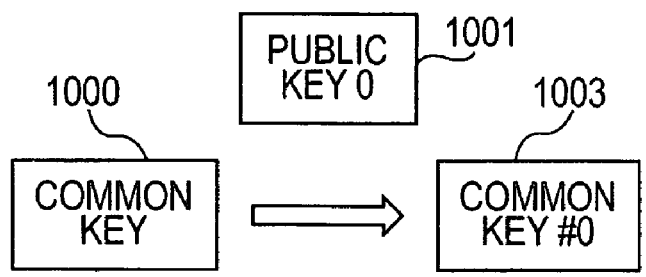
FIG. 10B shows a process of encrypting a common key using a public key 0.
Figure 10C:
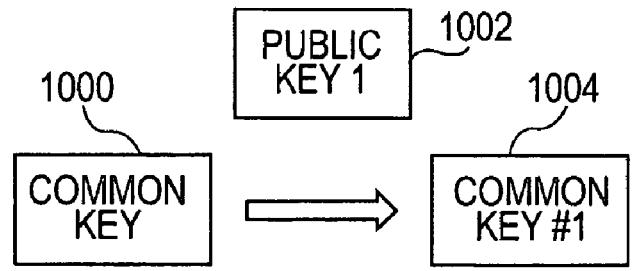
FIG. 10C shows a process of encrypting a common key using a public key 1.

The monitoring information data received by the data transmission module 205 is encrypted using a common key 1000 that is produced by the encryption module 203 each time encryption is performed (FIG. 10A). Use of the common key 1000 in encryption of the monitoring information data allows an increase in the processing speed at which the encryption/decryption process is performed.

The common key 1000 is encrypted using the public key 0 (denoted by reference numeral 1001). As a result, a common key #0 (1003) is obtained (FIG. 10B). The common key 1000 is encrypted using the public key 1 (denoted by reference numeral 1002). As a result, a common key #1 (1003) is obtained (FIG. 10C). The original common key 1000 can be obtained by performing decryption using a corresponding private key.

Figure 11:
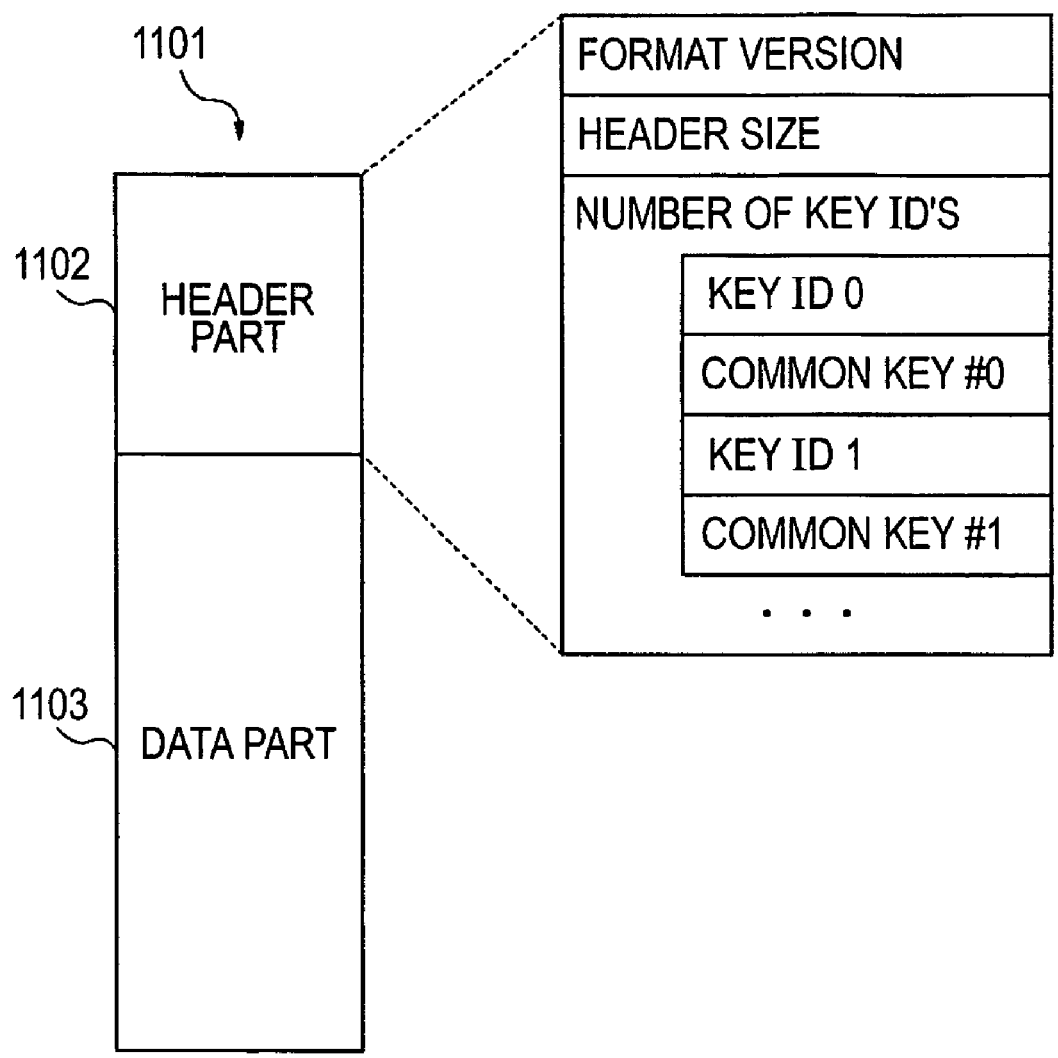
FIG. 11 is a diagram showing an example of a format of a file for transmission.

Referring again to FIG. 8, in step S507, notification information is produced in the form of file to be transmitted as e-mail by adding key ID information as header information to the encrypted monitoring information data. FIG. 11 shows a format of the file to be transmitted via e-mail.

In FIG. 11, the format 1101 includes a header part 1102 and a data part 1103. In the data part 1103, encrypted text encrypted using the common key 1000 described above with reference to FIG. 10A is placed. In the header part 1101, information indicating the format version of this format, the header size, the number of key IDs used to encrypt the common key 1000, as many key IDs as the number of public keys, and the encrypted common key are placed.

As described above, the file transmitted via e-mail includes a part in which decrypted information is placed and a part in which non-encrypted information is placed. In other words, before information is finally described in the form shown in FIG. 11, the original information includes information to be encrypted and information not to be encrypted.

In the next step S508 shown in FIG. 8, transmission destinations of the e-mail are set by the manager at the user site. That is, the service center (the MCHC system 101) is specified as the first output destination of the notification information, and a user site is specified as the second output destination different from the first output destination.

More specifically, the mail address of the MCHC system 101 is specified as the first output destination of the e-mail and described in the "TO" field so that monitoring information is transmitted from the user-site centralized monitoring apparatus 111 to the specified destination. The mail address specified by the manager at the user site is specified as the second output destination (for example, the PC 119) and described in the "CC" field.

In the next step S509, the e-mail transmission file produced in step S507 is attached to an e-mail and output to the destinations set in step S508. The e-mail is transmitted by the SMTP server 112 as e-mails M1 and M2 to the SMTP server 104 and the PC 119, respectively. More specifically, the e-mail M1 is transmitted to the MCHC system 101 via the SMTP server 104. Thus, e-mails having the same content are transmitted to a plurality of destinations set in step S508.

As described above, because the e-mail having the same content as that of the e-mail transmitted to the MCHC system 101 is also transmitted to the destination specified by the user by means of broadcasting, the user can acquire the same data as that transmitted to the MCHC system 101, and thus user can easily check the monitoring information.

Figure 12:
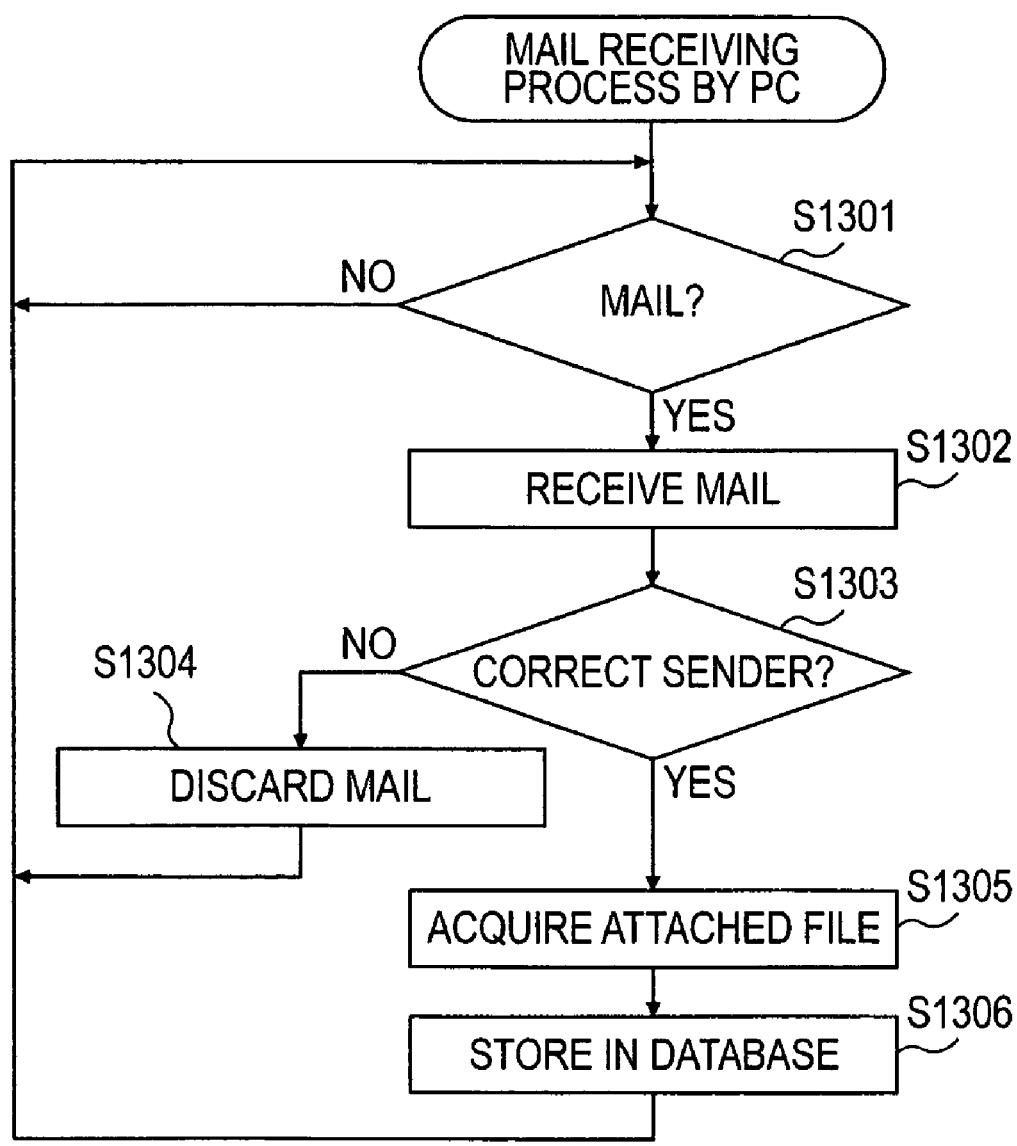
FIG. 12 is a flowchart showing an e-mail receiving process performed by a personal computer.

FIG. 12 is a flow chart showing an e-mail receiving process performed by the PC 119.

In step S1301, the manager having a mail account of the destination set in step S508 shown in FIG. 8 periodically checks whether e-mail has arrived by using mail software on the PC 119. If e-mail is detected, the e-mail is received in step S1302.

In step S1303, the sender of the e-mail is checked. If it is determined that the e-mail has been received from the correct sender, an attached file is extracted from the received e-mail (step S1305), and stored in the database 118 (step S1306). On the other hand, if the sender is not correct, the received e-mail is discarded (step S1304). The process then returns to step S1301.

Although in the present embodiment, e-mail transmitted from the user-site centralized monitoring apparatus 111 is received by the PC 119 and an attached file extracted from the received e-mail is stored in the database 118, the file may be stored in a file server or may be stored in a mail server. That is, there is no particular restriction on the manner in which e-mails are stored, as long as e-mails can be acquired when they are needed.

Figure 13:
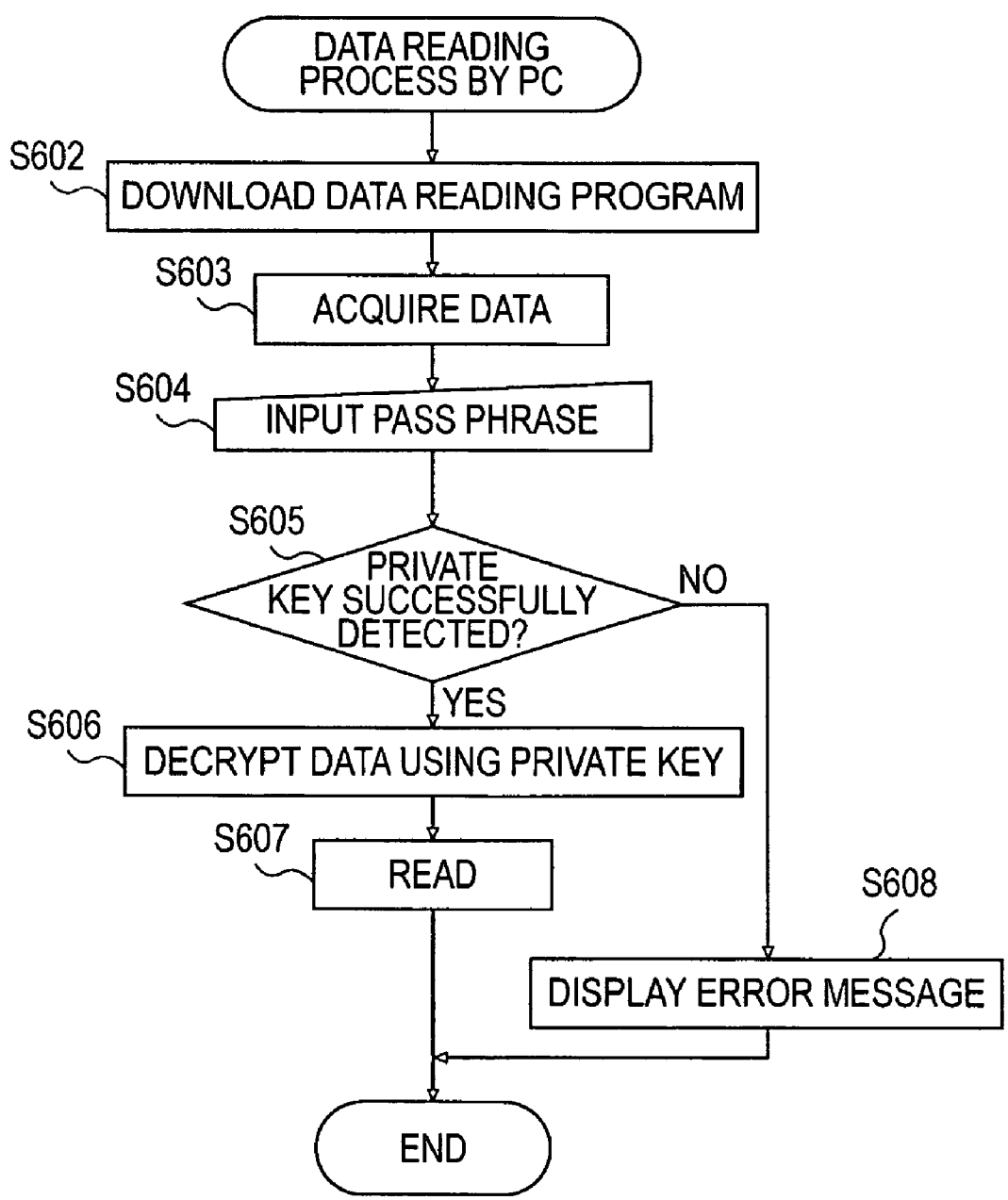
FIG. 13 is a flowchart showing a data reading process performed by a personal computer.

FIG. 13 is a flow chart showing a data reading process performed by the PC 113.

In FIG. 13, in accordance with a command issued by the checker, the PC 113 downloads the data reading program 206 prepared in step S308 shown in FIG. 3 from the HTTP serve module 204 in the user-site centralized monitoring apparatus 111 (step S602). The downloaded data-reading program 206 automatically starts, and the following process is performed.

Figure 14A:
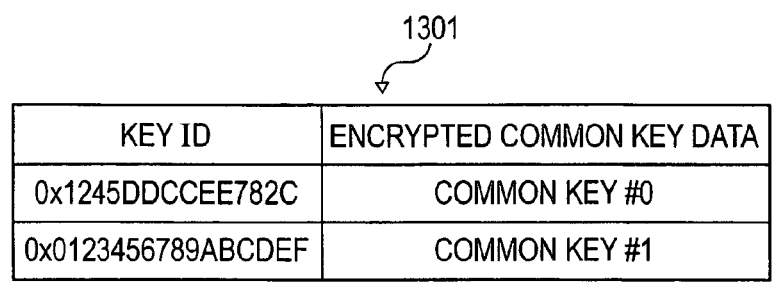
FIG. 14A shows a list of common key data and key IDs.

In step S603, the monitoring information data stored in step S1306 shown in FIG. 12 is read from the database 118. Note that this monitoring information data is a file attached to an e-mail addressed to the PC 119 that is, to the manager having the mail account of the destination set in step S508 shown in FIG. 8. A key ID identifying a private key and an encrypted common key data are extracted from the header of the data, as shown in FIG. 14A.

Figure 14B:
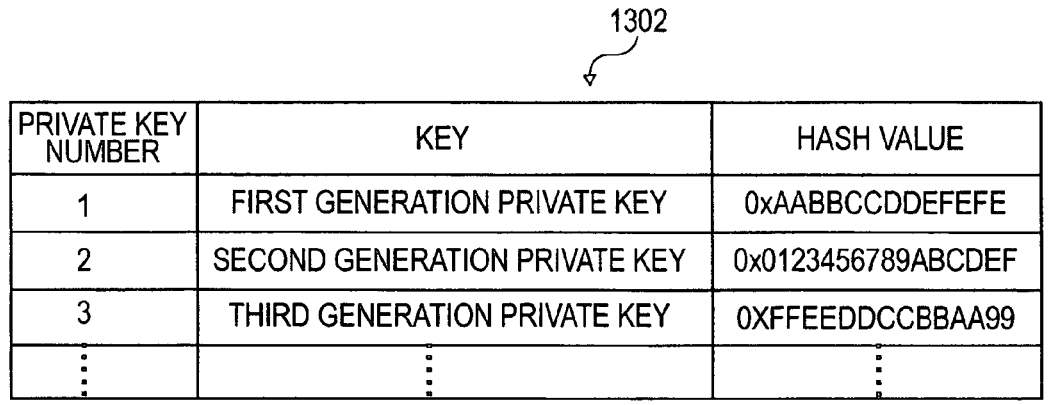
FIG. 14B shows a list of private keys of a bunch of keys and hash values determined from private keys and pass-phrases.

In the next step S604, a pass-phrase is input by the checker. This pass-phrase is the same as the pass-phrase input in step S302 in FIG. 3. A hash value is then determined from the input pass-phrase and the private key of the bunch of keys incorporated in the data reading program 206. FIG. 14B shows a list of private keys of a bunch of keys and hash values determined from private keys and pass-phrases.

In step S605, the hash values determined in step S604 are compared with the key ID extracted from the header of the data to determine whether the plurality of private keys stored in the PC 113 include a private key corresponding to the key ID. If there is no record having the same value, it is determined that the data reading program 206 does not include the private key necessary to decrypt the encrypted monitoring information data, and an error message is transmitted to notify the checker of the above fact (step S608). In this case, the process is ended.

On the other hand, if a correct private key is detected in step S605, the process proceeds to step S606. In this specific example, a private key 2 in the table 1302 shown in FIG. 14B has the same hash value as that of a key ID in the table 1301 shown in FIG. 14A, and thus the private key 2 in the table 1302 is employed as the decryption key. Note that the key ID 0 shown in FIG. 11 is described as "0X1245DDCCEE782C" in the table 1301, and the key ID 1 is described as "0X0123456789ABCDEF" in the table 1302. In step S606, a part or all of the encrypted notification information is decrypted using the detected private key.

More specifically, as shown in FIG. 15, the common key #1 (1004) is decrypted using the private key 2 (1501) determined as having the same hash value as the key ID of the common key #1 (1004) and selected as the decryption key in step S605. As a result, a common key 1000 is obtained. Subsequently, the encrypted data (encrypted text) in the data part of the monitoring information is decrypted using the obtained common key 1000 to obtain the original data (plain text). Thus, using the data-reading program 206, the checker can read the original data (the monitoring information associated with the image forming apparatus) in the form of plain text obtained as a result of the process including at least the decryption process in step S606 (step S607). This allows the checker to check whether notification information transmitted to the MCHC system 101 includes information transmitted in an unauthorized manner. The check can be performed, for example, by detecting an unauthorized keyword or the like according to a known technique.

Although in the present embodiment, the process described above is performed by the PC, other apparatus may also be used to perform the process, as long as the apparatus is capable of accessing the notification information, such as that shown in FIG. 11, received from the user-site centralized monitoring apparatus 111 and stored in the output destination such as the database 118 at the user site.

Via the process described above, the data-reading program 206 is downloaded into the PC 113 from the user-site centralized monitoring apparatus 111, and encrypted data is acquired from the user-site centralized monitoring apparatus 111 and is decrypted. Thus, the checker at the user site can read the decrypted data.

The data-reading program allows it to activate only a private key having the same pass-phrase used to produce the encryption key pair as the pass-phrase input by a user when the data reading program is started or when data is read, and thus it is allowed to decrypt and read only such data encrypted using a public key corresponding to the activated private key. That is, the user can manage the pass-phrase used to produce the encryption key pair so that it is allowed to decrypt only a data file encrypted using an encryption key corresponding to the pass-phrase.

Because the encrypted data file includes identification information (key ID) identifying the private key to be used, it is possible to correctly detect a corresponding private key from a plurality of private keys (the bunch of private keys) incorporated in the data reading program, and thus it is possible to decrypt data quickly and correctly without having to try to decrypt the data using many private keys.

In the first embodiment, as described above, the data acquisition module 202 acquires monitoring information from the image forming apparatus 115, 116, and 117. The HTTP server module 204 produces a new encryption key pair including a public key and a private key, and the data transmission module 205 encrypts the monitoring information based on the encryption key pair and transmits the encrypted monitoring information as a file attached to e-mail to the MCHC system 101 and also to the destination (the PC 119) specified by the user. The data transmission module 205 incorporates the private key in the encryption key pair together with private keys produced in the past in the form of a bunch of keys into the data-reading program 206, and makes preparations so that the data-reading program can be downloaded. The monitoring information transmitted to the PC 119 is decrypted using the data-reading program downloaded to the PC 113, so that the checker can read the decrypted monitoring information. This makes it possible for only a particular authorized user to read the encrypted monitoring information associated with the image forming apparatus, without allowing an unauthorized person to read it, and thus the checker can check the monitoring information in a highly efficient manner.

Second Embodiment

A monitoring system according to a second embodiment of the present invention is now described. In the following description of the second embodiment, similar parts to those of the first embodiment are denoted by similar reference numerals, and a duplicated explanation thereof is omitted.

FIG. 16 is a diagram showing a general configuration of the monitoring system according to the second embodiment of the present invention.

As shown in FIG. 16, the monitoring system includes, at a service center, a MCHC system 101, a database 102, an HTTP/SOAP server 301 capable of performing communication using HTTP or SOAP, and a LAN 103.

The HTTP/SOAP server 301 is connected to the Internet 120 via a LAN 106. If the HTTP/SOAP server 301 receives data via the Internet 120, the HTTP/SOAP server 301 transfers the received data to the MCHC system 101.

The monitoring system also includes, at each user site, a user-site centralized monitoring apparatus 300, a database 118, a PC 113, and image forming apparatus 115, 116, and 117.

The user-site centralized monitoring apparatus 300 acquires, at scheduled time intervals, monitoring information such as information indicating the number of printed sheets or information indicating an occurrence of an error from the image forming apparatus 115, 116, and 117 connected via the network (such as the LAN 114). The user-site centralized monitoring apparatus 300 transmits the monitoring information acquired from the image forming apparatus 115, 116, and 117 to the MCHC system 101 using the HTTP or the SOAP, and the user-site centralized monitoring apparatus 300 stores a copy of the monitoring information in the database 118 or the file server (not shown) at the user site.

A person responsible for checking the monitoring information downloads the data-reading program 206 for reading the monitoring information from the user-site centralized monitoring apparatus 300 into the PC 113. Note that the output destination of the monitoring information or the notification information is not limited to the PC 113.

The user-site centralized monitoring apparatus 300 has software modules including a data acquisition module 202, an encryption module 203, an HTTP server module 204, and an HTTP/SOAP transmission module 302 capable of serving as a SOAP client adapted to transmit encrypted monitoring information to the HTTP/SOAP server 301.

The software modules described above may be added or removed as plug-in modules to the OS so as to achieve desirable functions. Any parts of the user-site centralized monitoring system may be provided as a place where the plug-in modules to be added or removed.

The data acquisition module 202 acquires, at scheduled time intervals, monitoring information from the image forming apparatus 115, 116, and 117 by using the SNMP or another protocol, and the data acquisition module 202 converts the acquired monitoring information into data in a predetermined format and stores it.

The encryption module 203 has functions of transmitting a public key of a produced encryption key pair to the HTTP/SOAP transmission module 302, managing history information associated with private keys produced in the past and corresponding key IDs, and incorporating a private key into the data reading program 206.

The HTTP/SOAP transmission module 302 has a capability of performing communication with the MCHC system 101 using the HTTP or the SOAP, and also a capability of storing a data file on a hard disk (not shown) in the user-site centralized monitoring apparatus 300 or in an external database 118 or file server.

Figure 17:
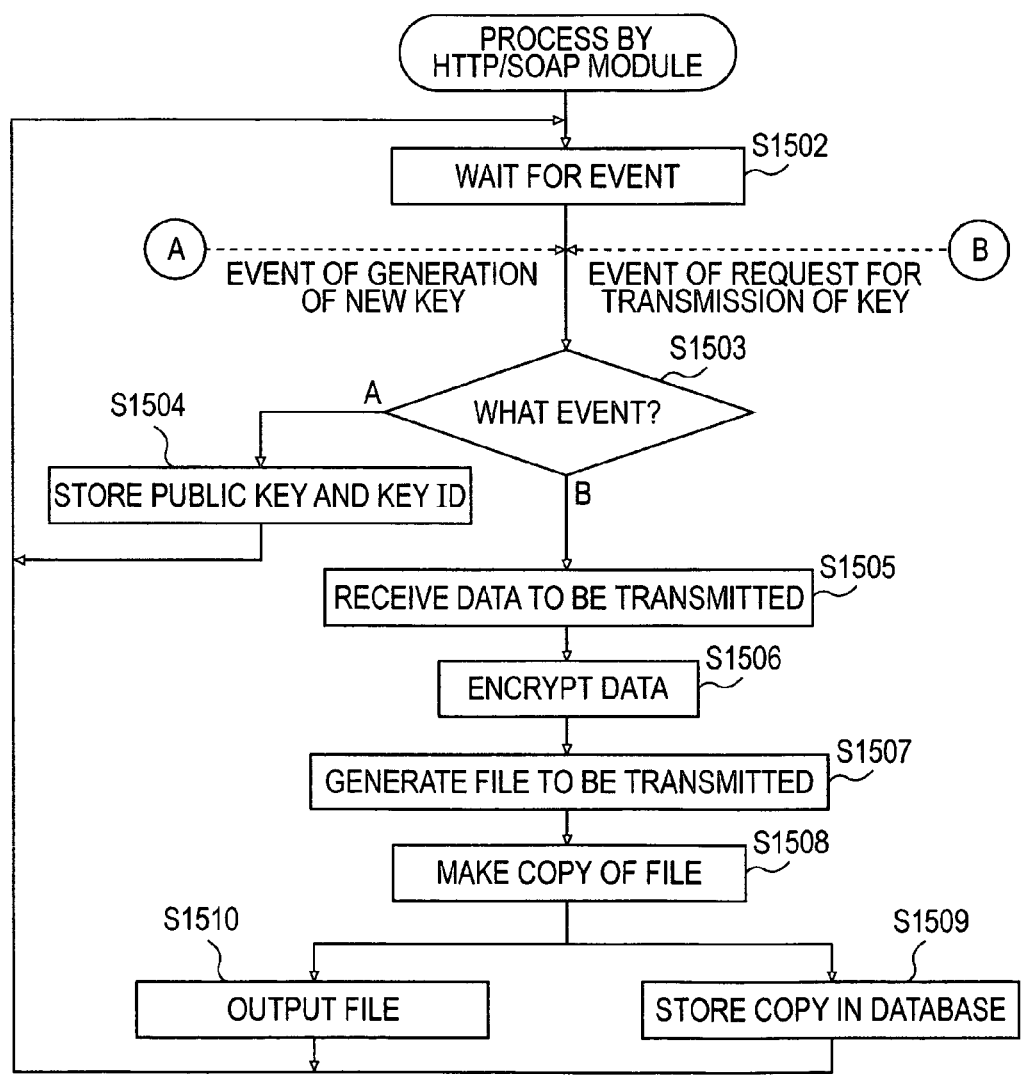
FIG. 17 a flowchart showing a process performed by an HTTP/SOAP transmission module shown in FIG. 16.

FIG. 17 is a flow chart showing a process performed by the HTTP/SOAP transmission module 302 shown in FIG. 16.

The HTTP/SOAP transmission module 302 receives a public key and a key ID from the HTTP server module 204, encrypts the data received from the data acquisition module 202 by using the public key, and transmits the resultant encrypted monitoring information.

In FIG. 17, when the HTTP/SOAP transmission module 302 starts, the HTTP/SOAP transmission module 302 waits for a notification of an event (step S1502). Herein, possible events include a "new key production" event, that is, an event of production of a public key and a key ID notified from the HTTP server module 204, and a "data transmission request" event notified from the data acquisition module 202.

In step S1503, a determination is made as to the type of the notified event. In a case in which it is determined that the "new key production" event (A) has occurred, the process proceeds to step S1504. In step S1504, the public key and the key ID received from the HTTP server module 204 are stored. The public key stored herein is used later in step S1506 to encrypt information. The key ID is used later in step S1507 to produce a file to be transmitted. The public key and the key ID are stored in the table 901 as shown in FIG. 9.

If it is determined in step S1503 that the notified event is a "data transmission request" event, the process proceeds to step S1505. In step S1505, monitoring information data is acquired from the data acquisition module 202. In the next step S1506, the received data is encrypted using the stored public key as shown in FIGS. 10A to 10C.

More specifically, the data received by the HTTP/SOAP transmission module 302 is encrypted using the common key 1000 produced by the encryption module 203 (FIG. 10A). The common key 1000 is then encrypted using the public key 0 (1001) and also encrypted using the public key 1 (1002) to obtain the common key #0 (1003) and the common key #1 (1004), respectively (FIGS. 10B and 10C).

Referring again to FIG. 17, in step S1507, a file to be transmitted is produced by adding key ID information as header information to the encrypted monitoring information data. The file to be transmitted is, for example, in the form 1101 shown in FIG. 11.

In the next step S1508, a copy of the file produced in step S1507 is made. In step S1509, the copy of the file to be transmitted is stored in the database 118. The capability of storing files in the database 118 makes it possible to acquire monitoring information in response to a request issued by a user responsible for checking the monitoring information, and thus great convenience is provided to the user. Note that copies of transmitted files do not necessarily need to be stored in the database 118 but they may be stored in other storage units, as long as the stored files can be read when they are needed for checking.

In step S1510, the file for transmission produced in step S1507 is output to the HTTP/SOAP server 301 by HTTP or SOAP transmission.

In FIG. 13, in accordance with a command issued by the checker, the PC 113 downloads the data-reading program 206 prepared in step S308 shown in FIG. 3 from the HTTP serve module 204 in the user-site centralized monitoring apparatus 300 (step S602). The downloaded data-reading program 206 is executed to perform the following process.

In step S603, the monitoring information data stored in step S1306 shown in FIG. 12 is read from the database 118. Note that this monitoring information data is stored in step S1509 shown in FIG. 17 into the database 118 by arbitrary means. A key ID identifying a private key and an encrypted common key data are extracted from the header of the data file, as shown in FIG. 14A.

In the next step S604, a pass-phrase is input by the checker. This pass-phrase is the same as that input in step S302 in FIG. 3. A hash value is then determined from the input pass-phrase and the private key of the bunch of keys incorporated in the data reading program 206, as shown in FIG. 14B.

In step S605, the hash values determined in step S604 are compared with the key ID extracted from the header of the data file to detect a private key corresponding to the key ID. If there is no record having the same value, it is determined that the data-reading program 206 does not include the private key necessary to decrypt the encrypted data file, and an error message is transmitted to notify the checker of the above fact (step S608). In this case, the process is ended.

On the other hand, if a correct private key is detected in step S605, the process proceeds to step S606. In this specific example, a private key 2 in the table 1302 shown in FIG. 14B has the same hash value as that of a key ID in the table 1301 shown in FIG. 14A, and thus the private key 2 in the table 1302 is employed as the decryption key.

In step S606, the encrypted data file is decrypted using the detected private key. More specifically, as shown in FIG. 15, the common key #1 is decrypted using the private key 2 (1501) determined as having the same hash value as the key ID of the common key #1 and selected as the decryption key in step S605. As a result, a common key 1000 is obtained. Subsequently, the encrypted data (encrypted text) in the data part of the data file is decrypted using the obtained common key 1000 to obtain the original data (plain text). Thus, the checker can read the original data in the form of plain text obtained as a result of the decryption process in step S606 executed by the data-reading program 206 (step S607).

Via the process described above, the data-reading program 206 is downloaded into the PC 113 from the user-site centralized monitoring apparatus 300, and encrypted data is acquired from the user-site centralized monitoring apparatus 111 and is decrypted. Thus, the checker at the user site can read the decrypted data file. Note that it is not necessarily needed to use the data reading program 206 to read the data, but another reading means may be used, as in the first embodiment.

In the second embodiment, as described above, the data acquisition module 202 acquires monitoring information from the image forming apparatus 115, 116, and 117. The HTTP server module 204 produces a new encryption key pair including a public key and a private key, and the data transmission module 205 encrypts the monitoring information based on the encryption key pair. When the encrypted monitoring information is transmitted in the form of a file to the HTTP/SOAP server 301, the monitoring information is stored in the database 118. The data transmission module 302 incorporates the private key of the encryption key pair together with private keys produced in the past in the form of a bunch of keys into the data-reading program 206 and makes preparations so that the data reading program can be downloaded. The monitoring information stored in the database 118 is acquired and decrypted using the data-reading program downloaded to the PC 113 so that the checker can read the decrypted monitoring information. This makes it possible for only a particular authorized user to read the encrypted monitoring information associated with the image forming apparatus without allowing an unauthorized person to read it, and thus the checker can check the monitoring information in a highly efficient manner.

Third Embodiment

A monitoring system according to a third embodiment of the present invention is now described. In this third embodiment, the system configuration is similar to that according to the first or second embodiment described above with reference to FIG. 1 or 16, and similar parts to those of the first or second embodiment are denoted by similar reference numerals and a duplicated explanation thereof is omitted. The following discussion will be focused on differences from the first or second embodiment.

In the first and second embodiments described above, acquired monitoring information associated with image forming apparatus is encrypted using a common key, and the common key is encrypted using a public key. The common key and the public key are used as encryption information used in encryption of a part, which should be encrypted, of notification information including monitoring information, and the common key and the private key are used as decryption information used in decryption of the encrypted information.

In contrast, in the third embodiment, acquired monitoring information associated with image forming apparatus is encrypted using a common key (a common key cryptosystem) instead of the public key cryptosystem. The common key used in the encryption of the monitoring information is prepared at the service center (the MCHC system 101) and the user site. The common key for use in the service center is encrypted using a first common key different from the common key used to encrypt the monitoring information, and the common key for use at the user site is encrypted using a second common key different from the common key used to encrypt the monitoring information.

In the third embodiment, the encryption module 203 shown in FIG. 2 has the function of producing a new common key to be used to encrypt monitoring information acquired from image processing apparatus. The encryption of the monitoring information is performed in a similar manner as described above with reference to FIGS. 10A to 10C. The public key 0 denoted by reference numeral 1001 shown in FIG. 10B corresponds to the common key 0, and the public key 1 denoted by reference numeral 1002 shown in FIG. 10C corresponds to the common key 1. The common key 0 is used as the encryption key determined by the MCHC system 101 as being for use by the service center, while the common key 1 is determined at the user site as being for use at the user site.

The data-reading program 206 manages the history of common keys produced in the past in the form of a bunch of keys, whose format is shown in FIG. 5. In the third embodiment, the "private key number" in the table 501 shown in FIG. 5 indicates the key number of the common key 1, and the "n-th generation private key" in the table shown in FIG. 5 corresponds to the n-th generation common key 1 (where n=1, 2, 3, . . . ).

Now, a process of newly producing encryption information used by the encryption module 203 is described below with reference to FIG. 3.

In step S303 shown in FIG. 3, instead of producing an encryption key pair, a common key is produced. Then in step S304, a key ID is produced from the pass-phrase and the common key.

In step S305, the produced common key and the key ID are transmitted as an event notification to the data transmission module 205. In step S306, the newly produced common key is added to the bunch of keys including common keys used in the past by encryption module 203. The following steps from step S308 are performed in a similar manner to the first or second embodiment described above.

Now, a process of producing a key ID is described below with reference to FIG. 4.

In this third embodiment, the encryption key pair 401 including the public key and the private key shown in FIG. 4 is not produced, instead a common key is produced, and the private key in the character string 402 is replaced with the common key newly produced in step S303 in FIG. 3. Note that as in the previous embodiments, the key ID does not necessarily need to be in the form described below, but the key ID may be in other forms (such as a checksum) as long as it can identify decryption information to be used to decrypt information encrypted using encryption information produced in step S303.

In this third embodiment, in step S504 in FIG. 8, in response to an occurrence of a new key production event, that is, in response to the production of a new key in the encryption information production process shown in FIG. 3, the common key and the key ID identifying the common key notified in step S305 are stored. The common key and the key ID are stored in a table, which is similar to the table 901 shown in FIG. 9 except that "public keys" are replaced with "common keys".

Now, an encryption process according to the third embodiment is described below with reference to FIG. 10.

First, the monitoring information data received by the data transmission module 205 is encrypted using a common key 1000 that is produced by the encryption module 203 each time encryption is performed (FIG. 10A). Note that the common key 1000 serves as encryption information.

The common key 1000 is then encrypted using the common key 1001 (corresponding to the public key 0 (denoted by reference numeral 1001) in FIG. 10B). As a result, a common key #0 (1003) is obtained (FIG. 10B). Furthermore, the common key 1000 is encrypted using the common key 1 (1002) (corresponding to the public key 1 (1002) in FIG. 10C) serving as encryption information. As a result, a common key #1 (1004) is obtained (FIG. 10C).

The original common key 1000 can be obtained by decrypting the common key #0 (1003) using the common key 1001 or by decrypting the common key #1 (1004) using the common key 1 (1002). One of the common key 1001 and the common key 1 (1002) is used as a common key for the user site, and the other one is used for the service center. In the third embodiment, the common key 0 corresponds to the encryption key determined by the MCHC system 101 as being for use by the service center, and the common key 1 corresponds to the encryption key determined at the user site as being for use at the user site.

Now, referring to FIG. 13, the process performed by the data-reading program according to the third embodiment is described below.

In the first and second embodiments described above, in step S605, a private key corresponding to one of key IDs included in the notification information such as that shown in FIG. 11 is detected from the bunch of keys. In contrast, in the third embodiment, not private keys but common keys are stored in the form of the bunch of keys as described above, and a common key corresponding to one of key IDs included in notification information is detected from the bunch of keys. The detected common key is used as decryption information.

In a case in which a correct common key is detected, the process proceeds to step S606 to perform decryption using the detected common key. More specifically, as shown in FIG. 15, first, in step S605, the common key #1 (1004) is decrypted using the common key (corresponding to the private key 2 (1501) in FIG. 15) with the same key ID selected from the bunch of keys stored as history information. As a result, a common key 1000 is obtained. This common key 1000 is used as decryption information.

Subsequently, the encrypted data (encrypted text) of the monitoring information is decrypted using the obtained common key 1000 to obtain the original data (plain text). Thus, using the data-reading program 206, the checker can read the original data (the monitoring information associated with the image forming apparatus) in the form of plain text obtained as a result of the process including at least the decryption process in step S606 (step S607).

In the first and second embodiments described above, as shown in FIG. 14B, the bunch of keys includes private keys produced in the past. In contrast, in the third embodiment, the bunch of keys includes common keys produced in the past. Thus, the "private key number" is replaced by the "common key number", and the "n-th generation private key" is replaced by the "n-th generation common key".

Fourth Embodiment

A monitoring system according to a fourth embodiment of the present invention is described. In this fourth embodiment, the system configuration is similar to that according to the first or second embodiment described above, and similar parts to those of the first or second embodiment are denoted by similar reference numerals and a duplicated explanation thereof is omitted. The following discussion will be focused on differences from the first or second embodiment.

In the first and second embodiments described above, notification information is encrypted using a common key or a public key, and a common key or a private key is used as decryption information in decryption of encryption information.

On the other hand, in the third embodiment described above, the encryption process, which is performed using the common key and the public key in the first or second embodiment, is performed using the public key without using the common key, and the decryption is performed using the corresponding private key. The private key is identified in a similar manner to the first or the second embodiment. In this case, the encrypted part of notification information is fully decrypted using the identified private key, and thus high security can be achieved as in the first and second embodiments, although the decryption process needs a longer time than needed in the first or second embodiment.

As described above with reference to specific embodiments, the present invention provides a technique of monitoring an image forming apparatus with high security in terms of protection of information.

Although data transmitted from the monitoring apparatus (user-site centralized monitoring apparatus 111) to the MCHC system is encrypted to achieve high security, a checker can easily decrypt the encrypted data to check the content of the data.

Even if decryption information (such as a common key) used to decrypt encrypted data transmitted from a monitoring apparatus to the MCHC system is leaked to an unauthorized person, it is possible to prevent the data transmitted from being read by the unauthorized person.

The objects of the present invention may also be achieved by providing to a system or an apparatus a storage medium having software program code stored thereon for implementing the functions disclosed in the embodiments described above and by reading and executing the program code on a computer (or a CPU or an MPU) disposed in the system or the apparatus.

In this case, the program code read from the storage medium implements the functions disclosed in the embodiments described above, and the storage medium on which the program code is stored falls within the scope of the present invention.

Specific examples of storage media which can be employed in the present invention to supply the program code include a floppy disk, a hard disk, a magneto-optical disk, a CD-ROM, a CD-R, a CD-RW, a DVD-ROM, a DVD±R, DVD-RAM, DVD±RW, a magnetic tape, and a nonvolatile memory card. The program code may also be supplied by downloading via a network.

The program code stored on the storage medium may be loaded into a memory of an extension card inserted in a computer or into a memory of an extension unit connected to a computer, and part or all of the process may be performed by a CPU disposed on the extension card or the extension unit in accordance with the loaded program code. Such implementation of the functions also falls within the scope of the present invention.

The functions disclosed in the embodiments may be implemented not only by executing the program code on a computer, but part or all of the process may be performed by an operating system or the like running on the computer in accordance with a command issued by the program code. Such implementation of the functions also falls within the scope of the present invention.

The program may be supplied directly from a storage medium on which the program is stored or may be supplied by downloading the program from a computer or a database (not shown) connected to a network such as the Internet, a commercial network, or a local area network.

Although in the embodiments described above, the image forming apparatus is assumed to be of the electrographic type, the image forming apparatus is not limited to such a type. Other types such as an ink-jet type, a thermal-transfer type, a thermal type, an electrostatic type, or a discharging type may also be used.

The program may be in the form of an object code, a program code executed by an interpreter, or script data supplied to an OS (Operating System).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2005-175507 filed Jun. 15, 2005, which is hereby incorporated by reference herein in its entirety.

What is claimed is:

1. A monitoring apparatus adapted to communicate with at least one image forming apparatus and an information processing apparatus via a local area network, and to communicate with a central monitoring apparatus, the monitoring apparatus comprising:
　at least one microprocessor programmed to control:
　　an acquisition unit adapted to acquire monitoring information associated with the image forming apparatus;
　　an encryption unit adapted to perform a first encryption process for encrypting the acquired monitoring information, where the first encryption process encrypts a common key used for encrypting monitoring information, by using a first encryption key of the central monitoring apparatus;
　　an output unit adapted to output the encrypted monitoring information, on which the first encryption process has been performed by using the first encryption key, to a first output destination assigned to the central monitoring apparatus,
　　wherein the encryption unit is further adapted to perform a second encryption process encrypting the acquired monitoring information, where the second encryption process encrypts a common key used for encrypting monitoring information, by using a second encryption key different from the first encryption key, when the acquired monitoring information is output to a second output destination different from the first output destination; and
　　a server unit adapted to send, to said information processing apparatus, information which includes a decryption key corresponding to the second encryption key so that the encrypted monitoring information, on which the second encryption process has been performed by using the second encryption key when being output to the second output destination, can be read.

2. The monitoring apparatus according to claim 1, further comprising a storage unit adapted to store information specifying the first output destination and the second output destination,
　wherein if the second output destination is changed in accordance with a command input from the outside, the storage unit stores information indicating the changed second output destination.

3. The monitoring apparatus according to claim 1, wherein the output unit outputs unencrypted information together with the encrypted monitoring information, and the unencrypted information is used to identify a decryption key corresponding to the first or second encryption key used in the first or second encryption process.

4. The monitoring apparatus according to claim 3, wherein the encryption unit produces the unencrypted information based on the decryption key and a password specified by a user, and the information processing apparatus performs a decryption process on the encrypted monitoring information by using the decryption key identified based on the unencrypted information.

5. The monitoring apparatus according to claim 1, further comprising:
a production unit adapted to produce an encryption key used as the second encryption key by the encryption unit and a decryption key corresponding to the second encryption key,
wherein the second encryption key produced by the production unit is different from the first encryption key.

6. The monitoring apparatus according to claim 1,
wherein the encryption process performed by the encryption unit includes an encryption of a common key, the common key being used to encrypt the acquired monitoring information, and
wherein when the encrypted monitoring information is decrypted, the encrypted common key is decrypted by using the decryption key corresponding to the first or second encryption key used in the first or second encryption process, and the encrypted monitoring information is decrypted by using the decrypted common key.

7. The monitoring apparatus according to claim 1, wherein the information which includes the decryption key is a data-reading program for browsing the monitoring information, and the decryption key is incorporated into the data-reading program.

8. The monitoring apparatus according to claim 5, wherein the monitoring apparatus sends, to said information processing apparatus, information which includes a bunch of decryption keys corresponding to the encryption keys produced by the production unit so that the encrypted monitoring information on which the second encryption process has been performed by using the second encryption key when being output to the second output destination can be read.

9. A control method for a monitoring apparatus adapted to communicate with at least one image forming apparatus and an information processing apparatus via a local area network, and to communicate with a central monitoring apparatus, the method comprising the steps of:
acquiring monitoring information associated with the image forming apparatus;
performing a first encryption process for encrypting the acquired information, where the first encryption process encrypts a common key used for encrypting monitoring information, by using a first encryption key of the central monitoring apparatus;
outputting the encrypted monitoring information, on which the first encryption process has been performed by using the first encryption key, to a first output destination assigned to the central monitoring apparatus;
performing a second encryption process for encrypting the acquired monitoring information, where the second encryption process encrypts a common key used for encrypting monitoring information, by using a second encryption key different from the first encryption key, when the acquired monitoring information is output to a second output destination different from the first output destination; and
sending, to the information processing apparatus, information which includes a decryption key corresponding to the second encryption key so that the encrypted monitoring information, on which the second encryption process has been performed by using the second encryption key when being output to the second output destination, can be read.

10. The control method according to claim 9, further comprising the step of, if the second output destination is changed in accordance with a command input from the outside, storing information indicating the changed second output destination.

11. The control method according to claim 9, wherein
unencrypted information together with the encrypted monitoring information are outputted in the outputting step, and the unencrypted information is used to identify a decryption key corresponding to the first or second encryption key used in the first or second encryption process.

12. The control method according to claim 11, wherein
the encryption process produces the unencrypted information based on the decryption key and a password specified by a user, and
the information processing apparatus performs a decryption process on the encrypted monitoring information by using the decryption key identified based on the unencrypted information.

13. The control method according to claim 9, further comprising the step of:
producing an encryption key used as the second encryption key in the encryption process and a decryption key corresponding to the second encryption key,
wherein the produced encryption key used as the second encryption key is different from the first encryption key.

14. A computer-readable storage medium having stored thereon a computer-readable program which when loaded into and executed by a computer provides a control method according to claim 9.

* * * * *